United States Patent

Mutoh et al.

[11] Patent Number: 6,106,384
[45] Date of Patent: Aug. 22, 2000

[54] SEMIAUTOMATIC PIG DEBONER AND DEBONING PROCESS FOR PIG THIGH USING SAME

[75] Inventors: Takayuki Mutoh; Katsumi Toyoshima; Yasunori Kubo, all of Tokyo, Japan

[73] Assignee: Mayekawa Mfg. Co., Ltd., Tokyo, Japan

[21] Appl. No.: 09/135,013

[22] Filed: Aug. 17, 1998

[30] Foreign Application Priority Data

Aug. 18, 1997 [JP] Japan .................................. 9-236555

[51] Int. Cl.⁷ .................................................. A22C 17/04
[52] U.S. Cl. .......................................... 452/135; 452/136
[58] Field of Search .................................... 452/135, 136, 452/138

[56] References Cited

U.S. PATENT DOCUMENTS

| | | | |
|---|---|---|---|
| 2,893,051 | 7/1959 | Massengil | 452/136 |
| 5,108,344 | 4/1992 | Debey | 452/135 |
| 5,462,477 | 10/1995 | Ketels | 452/135 |
| 5,542,879 | 8/1996 | Kunig et al. | 452/135 |
| 5,713,787 | 2/1998 | Schoenmakers et al. | 452/136 |

*Primary Examiner*—Willis Little
*Attorney, Agent, or Firm*—Evenson, McKeown, Edwards & Lenahan, P.L.L.C.

[57] ABSTRACT

The present invention, in deboning process for a pig thigh in which a pig thigh held by gripping on a transport line is sequentially deboned starting from a hind shank, comprises preliminary processing steps of: gripping the ankle side section of a work by transport/processing means; removing a hip bone, and a sacrum and a caudal vertebrae of the gripped work; and cutting-in for a hind shank and a femur, and the process further comprises the steps of: stripping a meat section around the hind shank after it is processed in the preliminary processing steps; exposing a fibula to detecting the base position of a fibula head as a first sensing step; stripping a meat section around above a joint and cutting an organic tissue exposed by the stripping for separation of leg section muscles; cutting a patelliform bone related section; stripping for the femoral region and detecting the base position of a femur head as a second sensing step; cutting a femur head related section; and separating by cutting the meat section from the bone section to discharge, whereby a hygienic automatic deboning can be realized except the cutting-in for deboning by hand in the first stage.

9 Claims, 14 Drawing Sheets

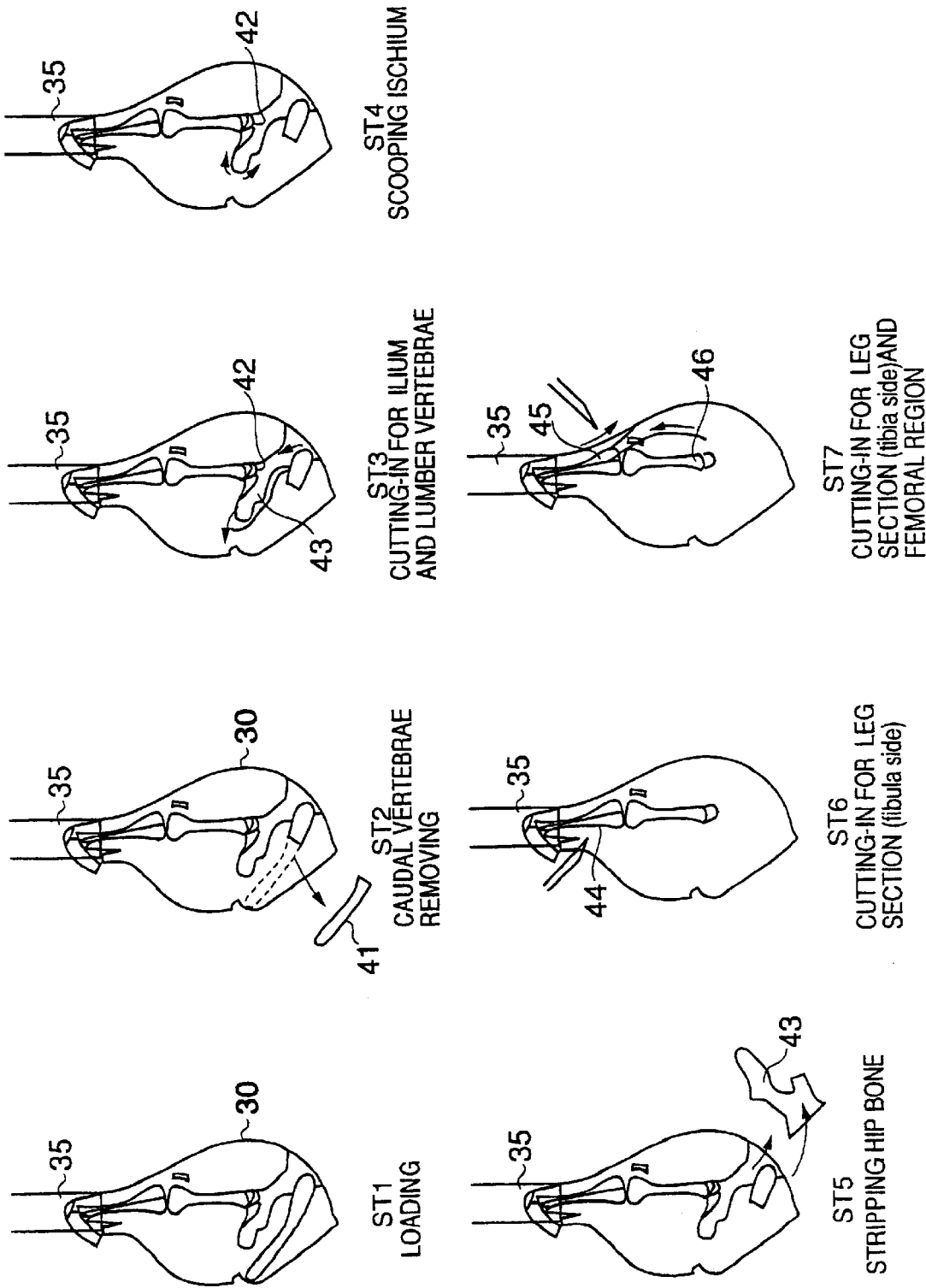

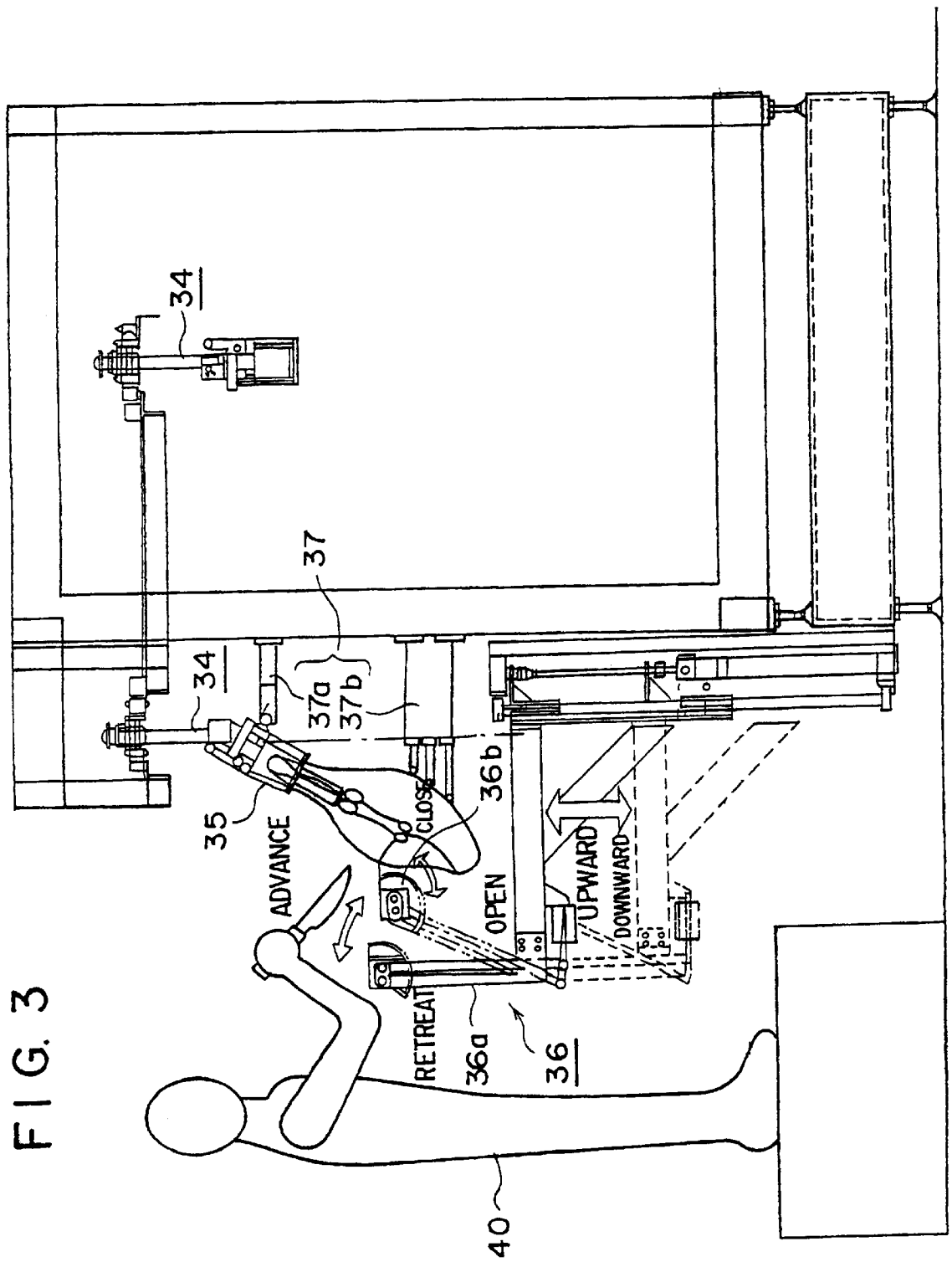

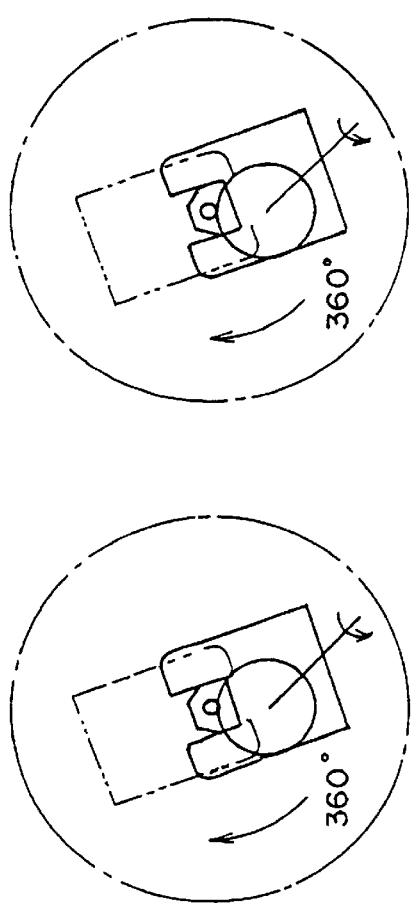
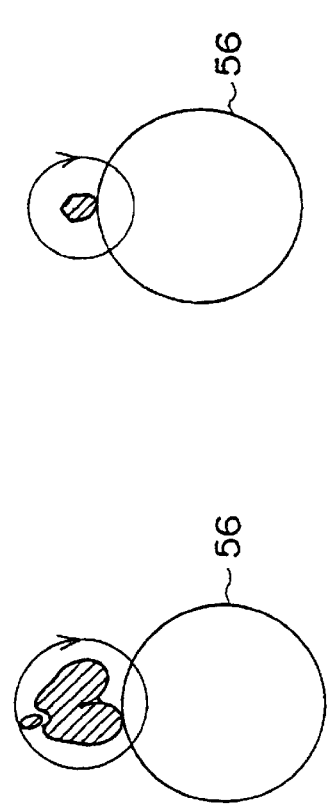
FIG. 7

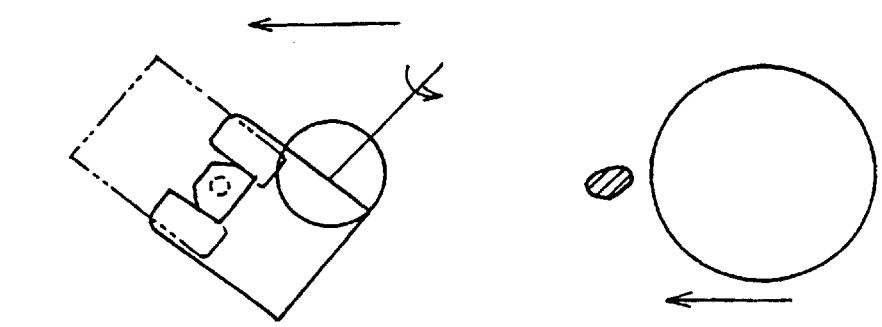
FIG. 8
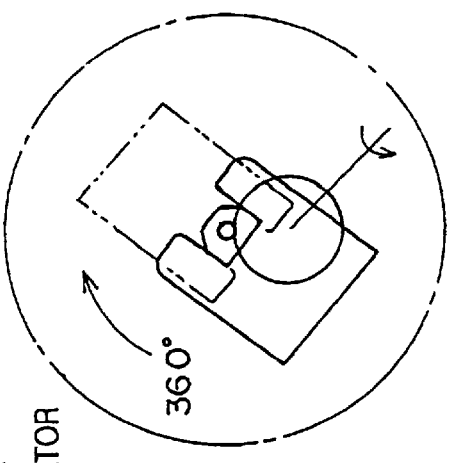
CUTTING AT THE BASE POSITION OF THE FEMUR HEAD CUTTING ST 17
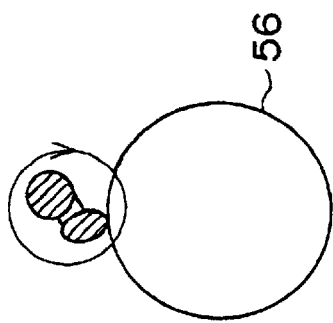
ALL CIRCUMFERENCE CUTTING
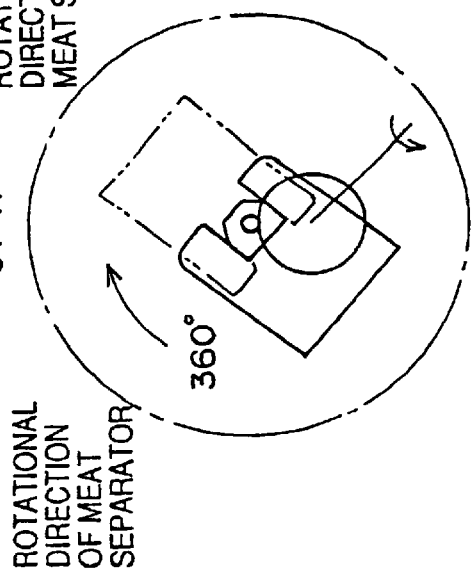
CUTTING AT A SECTION ABOVE THE FEMUR HEAD ST 18
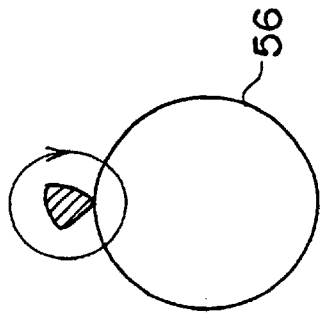
ALL CIRCUMFERENCE CUTTING

SEMIAUTOMATIC PIG DEBONER AND DEBONING PROCESS FOR PIG THIGH USING SAME

BACKGROUND OF THE INVENTION

1. Field of the Invention

The present invention relates to a semiautomatic pig thigh deboner and a deboning process for a pig thigh using the same in which removing the meat of the pig thigh from its bone is efficiently performed.

2. Description of the Prior Art

Deboning of a pig thigh has been performed in almost manual procedures such that the pig thigh is placed on a work table on its panniculus adiposus side, the meat is manually cut off and into the interior to open, and subsequently the bone is by hand wrenched away from the meat.

Since, in such a manner, a great part of a deboning process consists of manual operations such as cutting-in, cutting-off and wrenching-away, there has been problems in terms of hygiene and recovery, and, as an additional problem, since the manual deboning process comprises handling a heavy work, tearing off at a cut-open position and wrenching-away, as major parts thereof all performed by hand, workers have been forced to face a hard labor.

SUMMARY OF THE INVENTION

The present invention has an object to provide not only a deboning process for a pig thigh which is labor-saved and hygienic but a semi-automatic pig thigh deboner and a deboning process for a pig thigh using the same in which a meat stripping position, and cutting and cutting-in positions by a cutter are selected so as to be most optimal in performing and a more secured meat stripping operation is realized.

Details of a structure of a deboner and a deboning process of the present invention will be sequentially described.

All operations of the deboning process are performed in a condition where a work is hung in the air as it is gripped and the operations are thereby performed under as small an influence as possible of its self weight.

Then, since not only stripping of a meat section around a bone section but pulling-off of the bone section require large forces, effective utilization of a gravity from the self weight of the meat is considered and at the same time a plurality of auxiliary means driven by actuators are used.

A manual operation is limited to an important cutting-in operation and an organic tissue around a joint is cut-in or cut by a cutter which is pressed to the work while the work is rotated through a necessary angle.

In order to achieve such a task, a semi-automatic pig thigh deboner in which a pig thigh held by gripping on a transport line is sequentially deboned starting from a hind shank, comprises: the transport line along which a plurality of work stations are provided; transporting/processing means for transporting the pig thigh through the work stations sequentially and processings are respectively performed on the pig thigh at the work stations under application of driving forces for stripping of the meat section, rotating and vertical movement of the pig thigh; driving means comprising a meat stripping mechanism, a vertical movement mechanism and a rotating mechanism for outputting the driving forces for stripping of the meat section, rotating and vertical movement of the pig thigh, the driving means connecting to the transport/processing means at each of the work stations; cutting means for cutting an organic tissue away from a bone section exposed by stripping of the meat section; and detecting/computing means for detecting the base positions of heads of a fibula and a femur.

The transport/processing means comprises: a clamper to grip the ankle side section of a pig thigh as a work; and a transport mechanism including a boat-shaped engaging member mounted on a transport frame through which a connecting shaft which supports the clamper in a freely inclining manner is inserted. The boat-shaped engaging member is engaged with a straddle joint mounted at the lower section of a rotary vertically moving shaft of the vertical movement mechanism before the boat-shaped engaging member enter a station and constitutes a transfer joint to transfer two driving forces of rotating and vertical movement to the connecting shaft by means of the driving means.

The driving means which outputs driving forces of stripping of the meat section, rotating and vertical movement of the pig thigh preferably comprises: the vertical movement mechanism which vertically moves the connecting shaft through the boat-shaped engaging member when the work is kept stopped; and a rotating mechanism to rotate the connection shaft and a driving shaft for squeezing of a meat separator constituting a stripping mechanism in synchronization with each other.

As a deboning process using the deboner, a deboning process for a pig thigh of the present invention, in which after predetermined preliminary processing, the pig thigh is transported through a plurality of work stations and processed in each of the stations and thereby the pig thigh held by gripping on a transport line is deboned sequentially from a hind shank, comprises:

preliminary processing steps of holding by gripping an ankle side section of a work by the transport/processing means, removing a hip bone, and a sacrum and a caudal vertebrae of the gripped work and cutting-in for a hind shank and a femur;

hind shank removing step of stripping a meat section around the hind shank after it is processed in the preliminary processing steps;

first sensing step of exposing a fibula and detecting the base position of a fibula head;

leg section muscle separation cutting step of stripping a meat section around a section above a joint and cutting an organic tissue exposed by the stripping;

patelliform bone related cutting step;

second sensing step of stripping on the femoral region and detecting the base position of a femur head; femur head related cutting step; and final separation cutting step of separating by cutting the meat section from the bone section to discharge.

According the above steps, after the deboning procedures partly by hand in the preceding steps, a hygienic full automatic deboning operation can be made possible.

The above mentioned process is in a more detailed manner described as follows:

preliminary processing steps of being conducted on a work in a downwardly inclining position at about 30 degrees with respect to a vertical direction while the ankle side section is held by gripping at a higher position;

rotating step to rotate the work through 107 degrees after the completion of the preliminary processing steps; cutting step of cutting along all the circumference of the ankle side section;

stripping step of stripping a meat section on a hind shank till a point on the fibula consisting of the hind shank;

first sensing step of detecting a lower end section of the fibula;

leg section muscle separation cutting step;

cutting step of cutting a section above a patelliform bone;

cutting step of cutting a section around the middle of the patelliform bone;

separation start cutting step of stripping till a section on the femur under the femur joint and cutting along all the circumference of the section under the joint;

second sensing step of stripping for the femoral region and detecting the base position of the femur head;

cutting step of stripping till the base position of the femur head and cutting along all the circumference of a section above the femur head;

cutting step of stripping till the section above the femur head, cutting along all the circumference of a section around the femur head; and final separation cutting step.

Then actions of the present invention will be described in a concrete manner.

In the present invention, a work receives preliminary processing in which there is used a transport line along which a plurality of work stations are provided, a pig thigh (hereinafter simply referred to as work) is held by gripping and sequentially transported through the respective work stations and at each work station, the work takes a inclined position and removal of a hip bone, a sacrum and caudal vertebrae and cutting-in before and after deboning are performed, and the work further receives automatic deboning processing for which there is further used a transport/processing means in which stripping of the meat section, rotating and vertical movement of the work are performed with the help of driving means at respective work stations, whereby the present invention totally enables deboning to be performed in a hygienic and semi-automatic manner almost without any manual procedures.

The transport/processing means intermittently transport a work while holding by gripping to the respective work stations along the transport line, and at each work station, an engaging member and a straddle joint are coupled with each other and the gripped work is subjected to stripping of the meat section, rotating and vertical movement of the work by the driving means.

Since a vertical movement mechanism for vertically moving the work is in a fine manner controlled by a servo motor, a rotating mechanism for rotating the work has functions of home position driving, deceleration stoppage at a predetermined position, and locking at stop position, the work can vertically moved according to a stripped amount by a meat separator in each work station and a cutting position of a cutter can be set with certainty at a predetermined position, whereby precision in a cutting width is increased.

In the case of cutting of the interior of the work or an organic tissue, a cutter mechanism has a feed mechanism from a waiting position to a cutting position under a freely adjustable pressure and the work is adapted to rotate through a predetermined angle with respect to the cutter mechanism, whereby the organic tissue at a fixed position around a bone section can be cut not only with certainty but at a fixed width.

Since rotation of the pig thigh as work and rotation of the meat separator which holds a cutting section between two parts are in synchronization with each other by means of the rotating mechanism of the driving means, the above mentioned cutting operation can be performed in a smooth manner.

Since there is provided detecting/computing means for detecting the base positions of heads of fibula and femur, with use of computed results by the means two reference positions are set and a stripping position for a meat section in a later step can be predicted with accuracy and thereby deboning can be performed with efficiency. With setting of the reference positions, it is possible that a clamper does not fail to be returned to its previous position after it is raised by the vertical movement mechanism and coupling or disengaging of the straddle joint and the boat-shaped engaging member is in a secured manner performed without any interference from others.

Since the rotating mechanism of the driving means has the functions of home position driving and deceleration stoppage at a predetermined position, and thereby rotation control of the clamper and the meat separator can in a secured manner be performed, a cutting position and a cutting width by means of the cutting mechanism can be controlled with accuracy.

Since the meat separator comprises squeezing plates each with a U-shaped concavity which are driven by squeezing mechanism under a freely adjustable pressure, the meat separator can be adapted to a change in shape of a bone section so as to achieve perfect stripping when the meat section is stripped.

Since the meat separator rotates at a synchronous speed with the clamper, the bone and meat sections of the work can rotate at equal speed when the meat section of the work and an organic tissue is cut or cut in by means of the cutting mechanism, which makes smooth cutting realized.

Since the cutting means has a structure which has the feed mechanism under a freely adjustable pressure, the cutter can easily be fixed at a cutting position and perfect cutting can be realized. Besides, since a structure which can control a rotational angle of the work through which the cutter contacts is adopted, making sure of a given cutting width and setting of a given cutting position can be performed.

As the cutter, a horizontal circular blade is preferably used.

The detecting/computing means when detecting the base position of a fibula head comprises a sensor section which, in a sliding and inclined manner, contacts with the bone section exposed in company with moving down of the separator which strips off the meat section from the bone section and has a structure that detection and computation of a position can be performed in correspondence to a shape change of the bone section in contact, while, since the detecting/computing means when detecting the base end of a femur head has a measuring section of a structure that a connecting shaft which is connected to the clamper is further connected to a vertical movement section driven by an air cylinder and a rapid slow-down of the femur head in the upward movement by the squeezing section of the separator can be detected and computed by an encoder mounted on the air cylinder, the base positions of heads of the fibula and femur which are conspicuous in shape change can be detected and computed with certainty.

The preliminary processing apparatus has a structure that waste of labor is suppressed to its minimum, the work keeps a downwardly inclined position at an inclination of about 30 degrees and thus manual cutting-in can be performed at the minimal labor. Thereby, deboning with the help of the hip bone, a sacrum and caudal vertebrae removing apparatus and automatic deboning in a later stage can be realized.

BRIEF DESCRIPTION OF THE DRAWINGS

FIG. 2 is views showing conditions of processing steps in a preliminary processing apparatus.

FIG. 3 is a condition of stripping a hip bone at ST 5 of FIG. 2.

FIG. 7 is diagrams showing conditions of rotation of a meat separator and cutting planes at ST14 and ST15 of FIG. 5.

FIG. 8 is diagrams showing conditions of rotation of a meat separator and cutting planes at ST17, ST18 and ST19 of FIG. 5.

In the figures, 30 indicates a pig thigh, 31 a preliminary processing apparatus, 32 a full automatic deboner, 33 a transport chain, 33a the transport rails, 34 transport/processing means, 35 a clamper, 36 a hip bone, a sacrum and caudal vertebrae removing apparatus, 37 a inclining mechanism, 40 an operator, 41 a coccyx, 42 an ischium, 43 a hip bone, 45 a hind shank, 46 a femur, 50 a meat separator, 51 a driving shaft, 52: squeezing members, 53 an actuator, 54, 65 chain transfer mechanisms, 55 a cutter mechanism, 56 a rotary circular blade, 58 a feed/retreat cylinder, 59: an oscillation cylinder, 60: a carriage, 61: a rectangular member, 62 a connecting shaft, 63 a boat-shaped engaging member, 64 a rotary vertically moving shaft, 64a a straddle joint, 67 a vertical movement mechanism, 69 a rotating mechanism, 70 driving means, 71 a sensor, 83 a guide, 87 a measuring plate and 90 detecting/computing means for detecting the base position of a fibula.

DETAILED DESCRIPTION OF THE PREFERRED EMBODIMENT

The present invention will in detail be described by use of examples showing in the figures below. It should be noted that sizes, materials and shapes of structural parts and relative configurations of the parts described in the examples are intended not to limit the scope of the present invention to them but are shown exemplarily only.

Figure 1A:
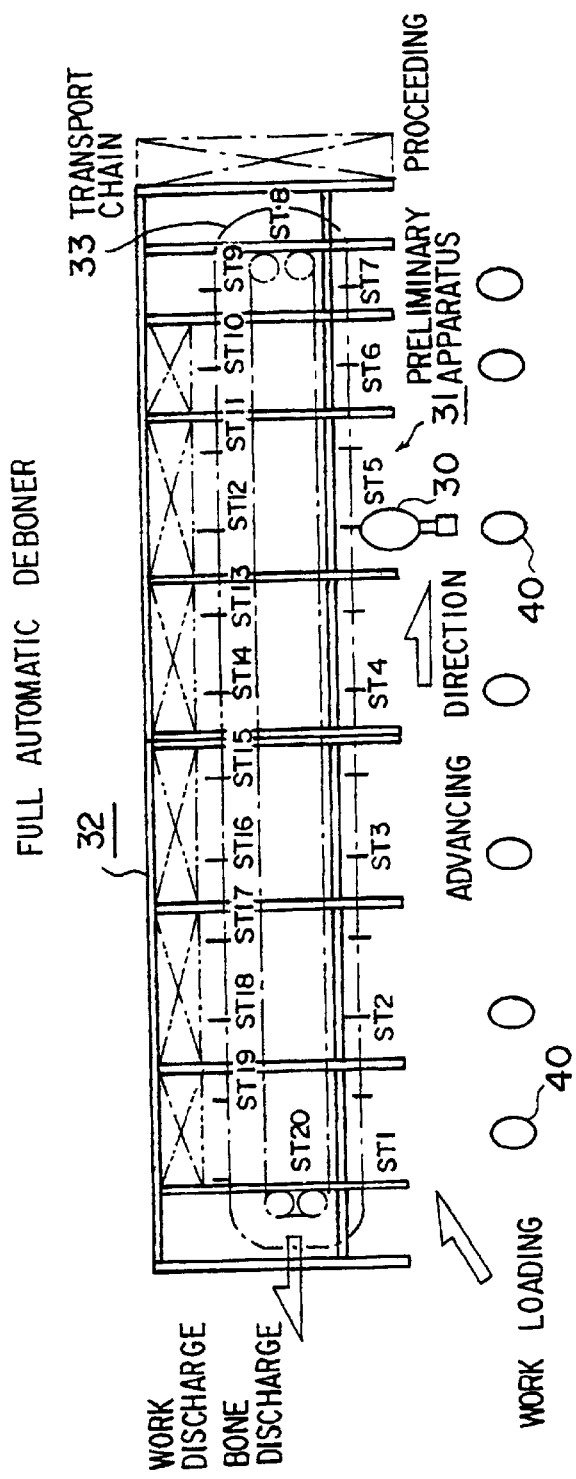
FIG. 1(A) is a front view showing a schematic constitution of a semi-automatic deboning process for a pig thigh of the present invention and FIG. 1(B) is a side view of the same.
Figure 1B:
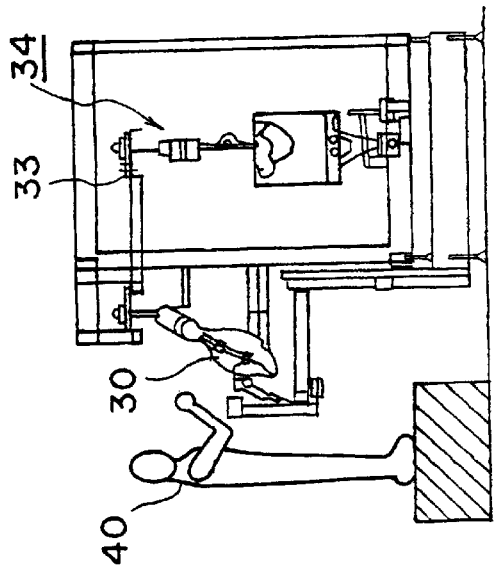
Figure 4:
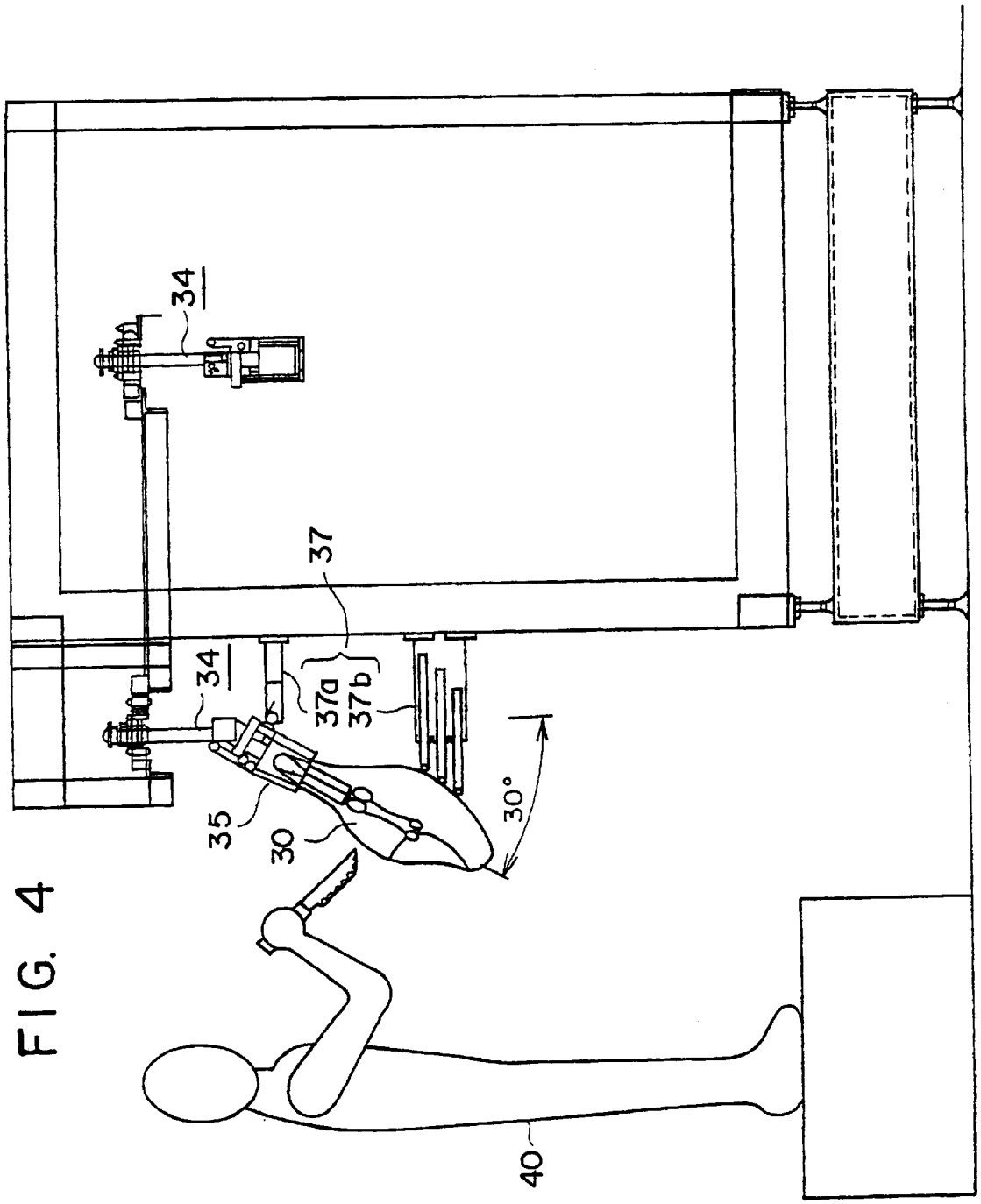
FIG. 4 is a view showing a cutting-in operation of FIG. 2.
Figure 5:
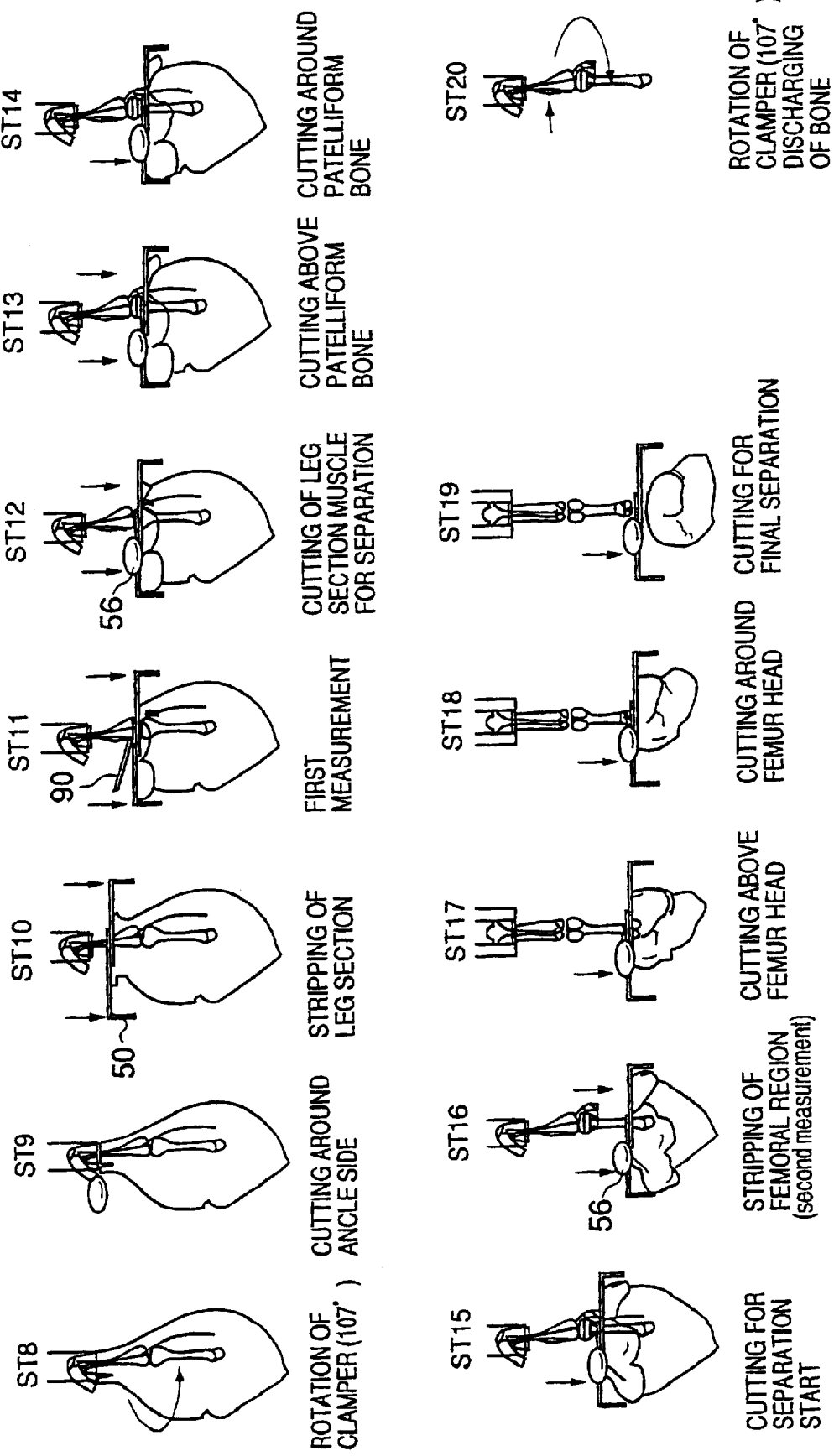
FIG. 5 is a view showing conditions of processing steps in a full automatic processing apparatus of FIG. 1.
Figure 9:
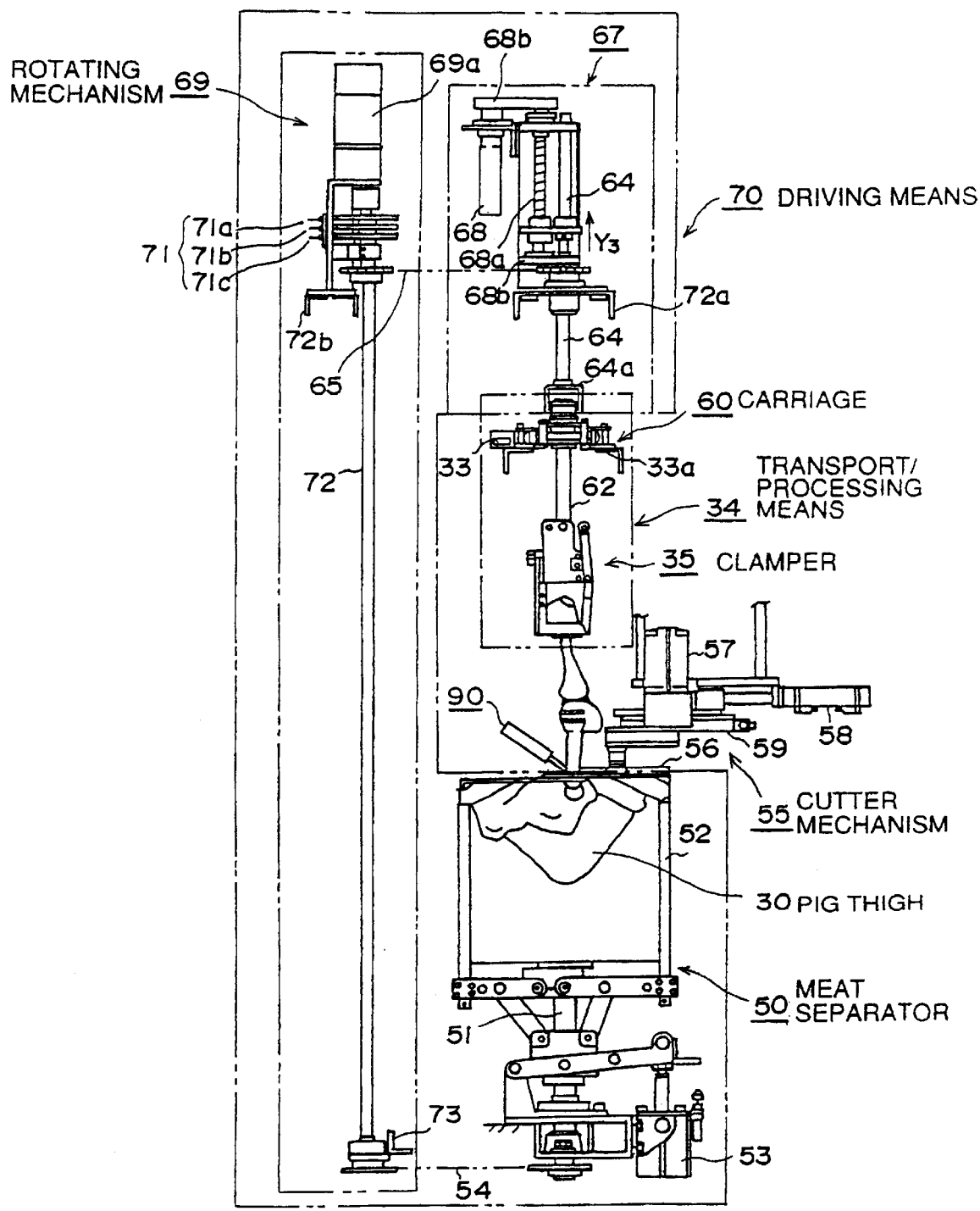
FIG. 9 is a view showing how a driving means is connected to a transport/processing means of FIG. 1 at a station.
Figure 10B:
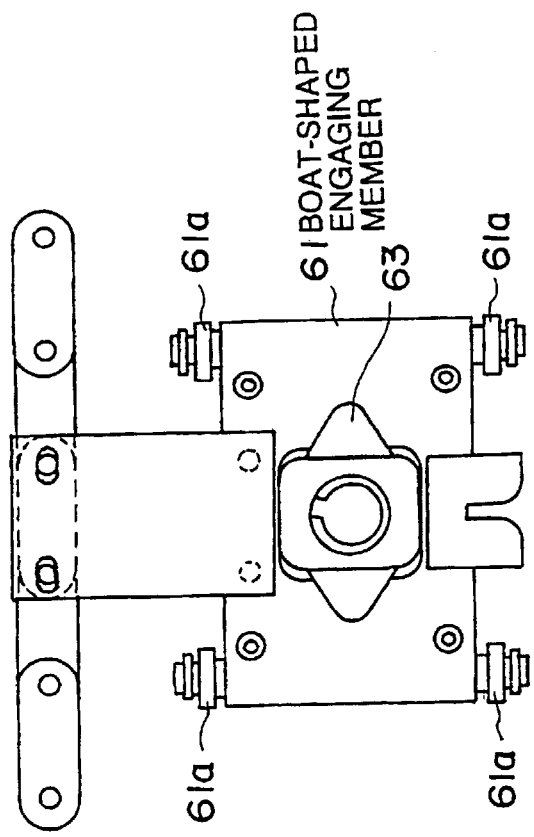
FIG. 10(B) is a side view of the same.
Figure 10A:
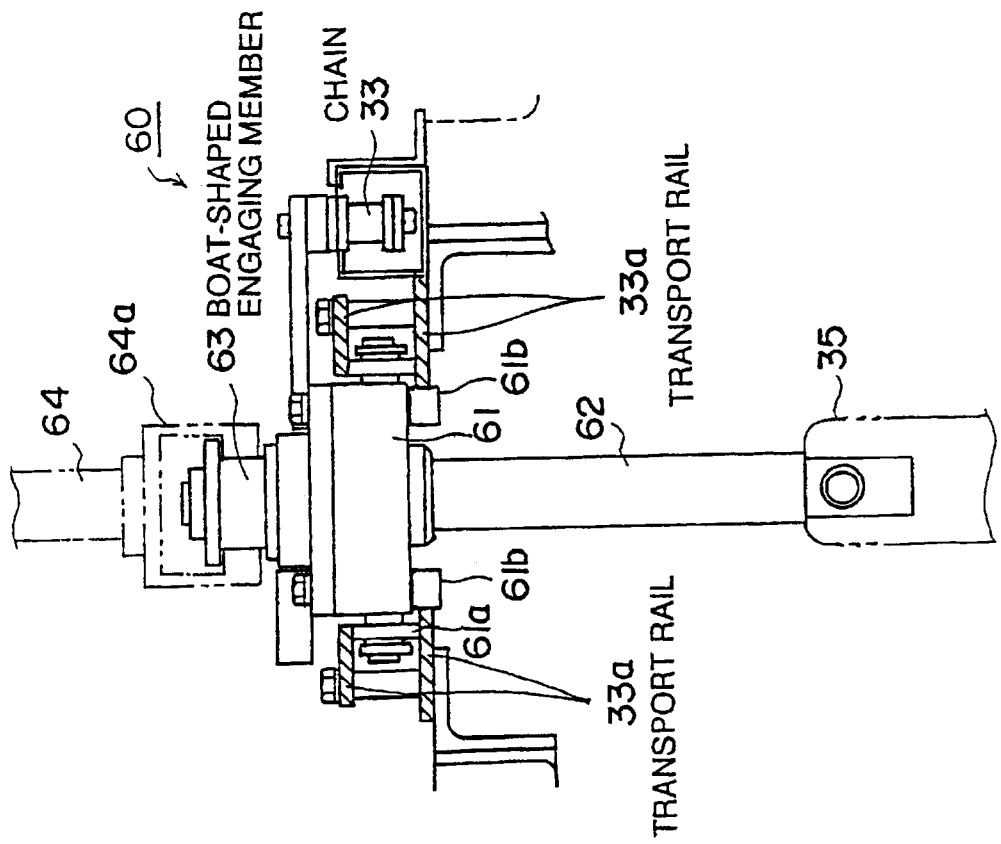
FIG. 10(A) is a front view showing a structure of a carriage constituting a transport mechanism running on transport rails while hanging a clamper of FIG. 9
Figure 12:
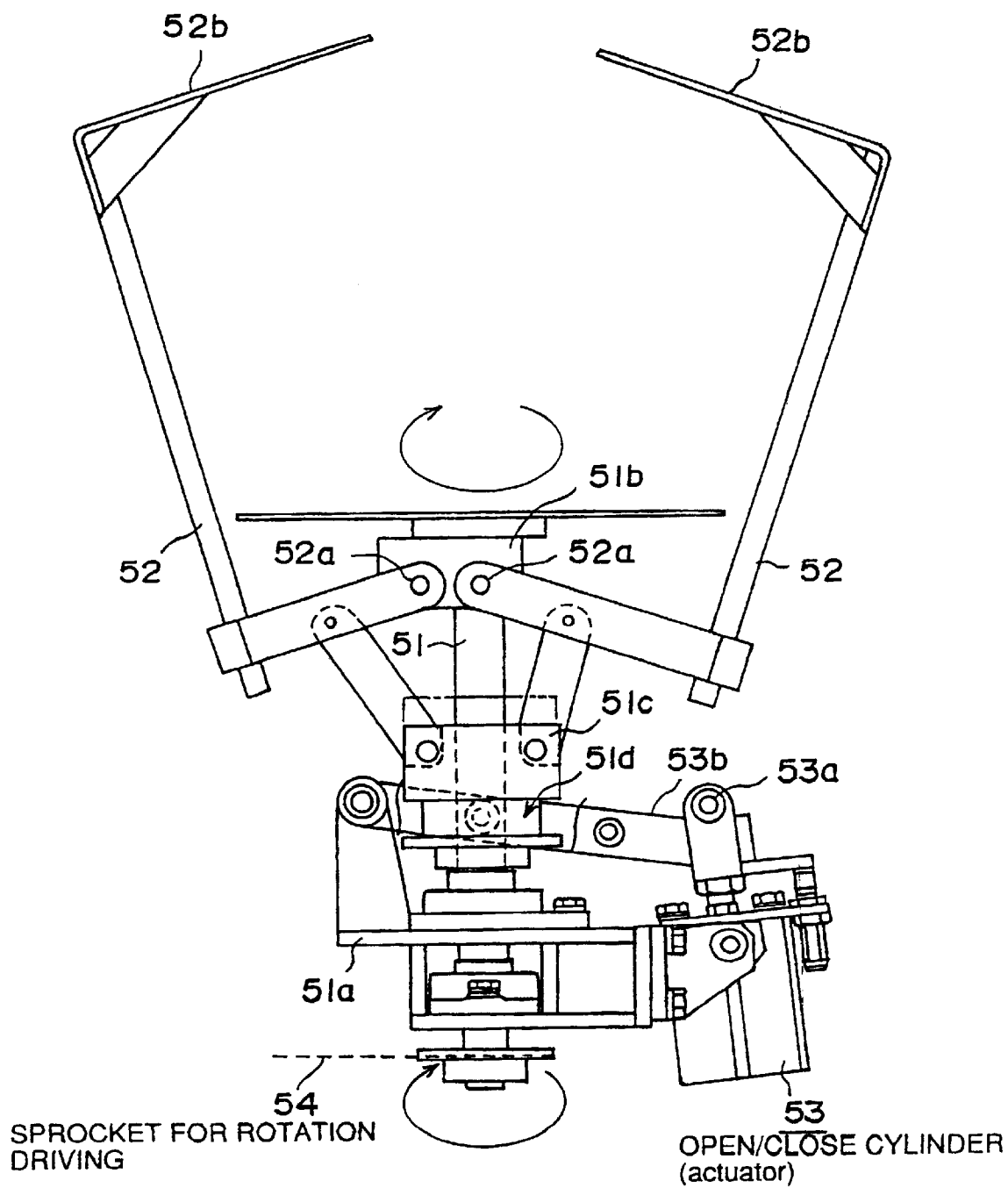
FIG. 12(A) is a front view of a cutter mechanism constituting a cutting means and FIG. 12(B) is a side view of the mechanism.
Figure 13:
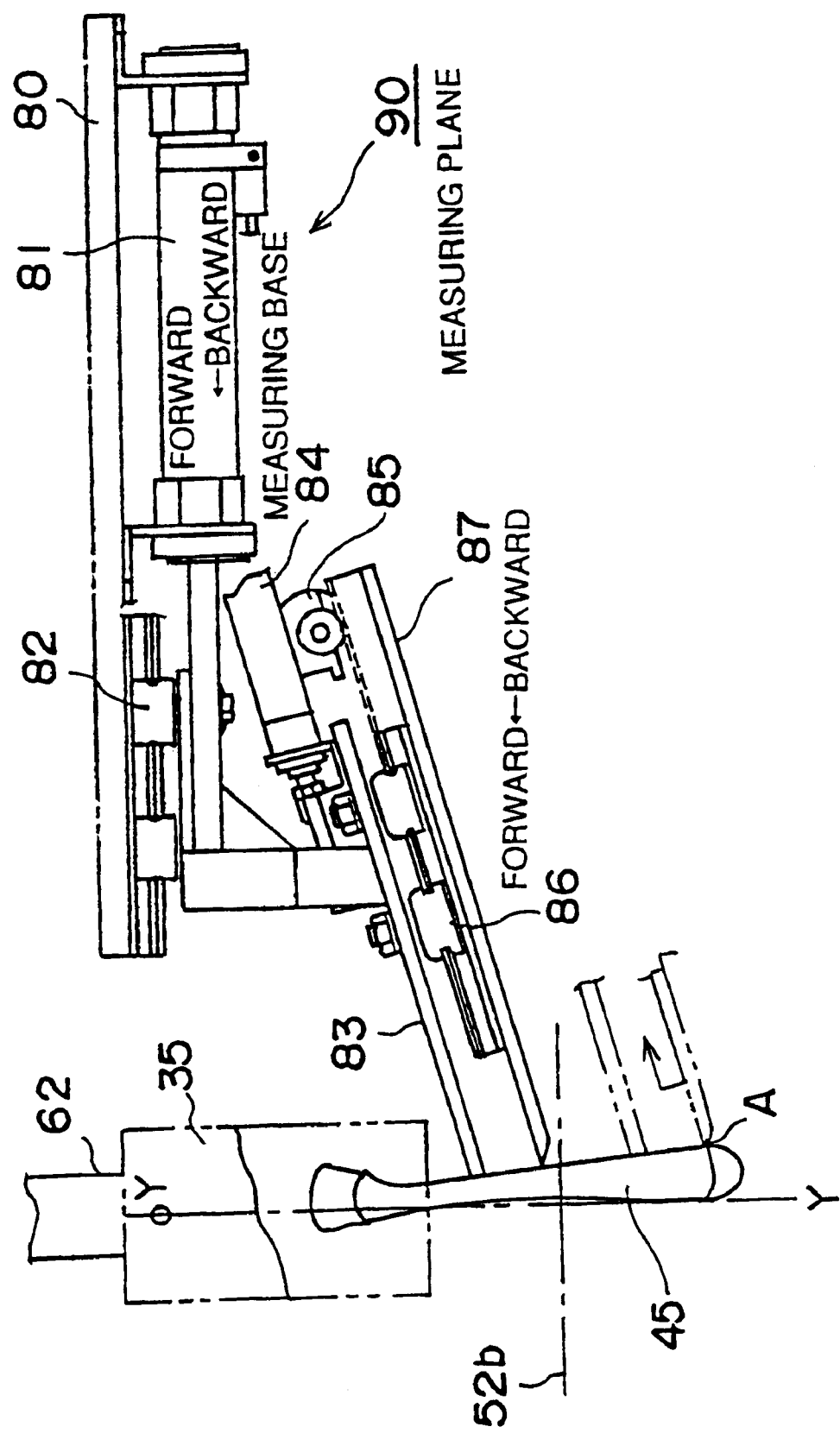
FIG. 13 is a side view showing a schematic structure of a detecting/computing means for detecting the base position of a fibula head of FIG. 9.
Figure 14:
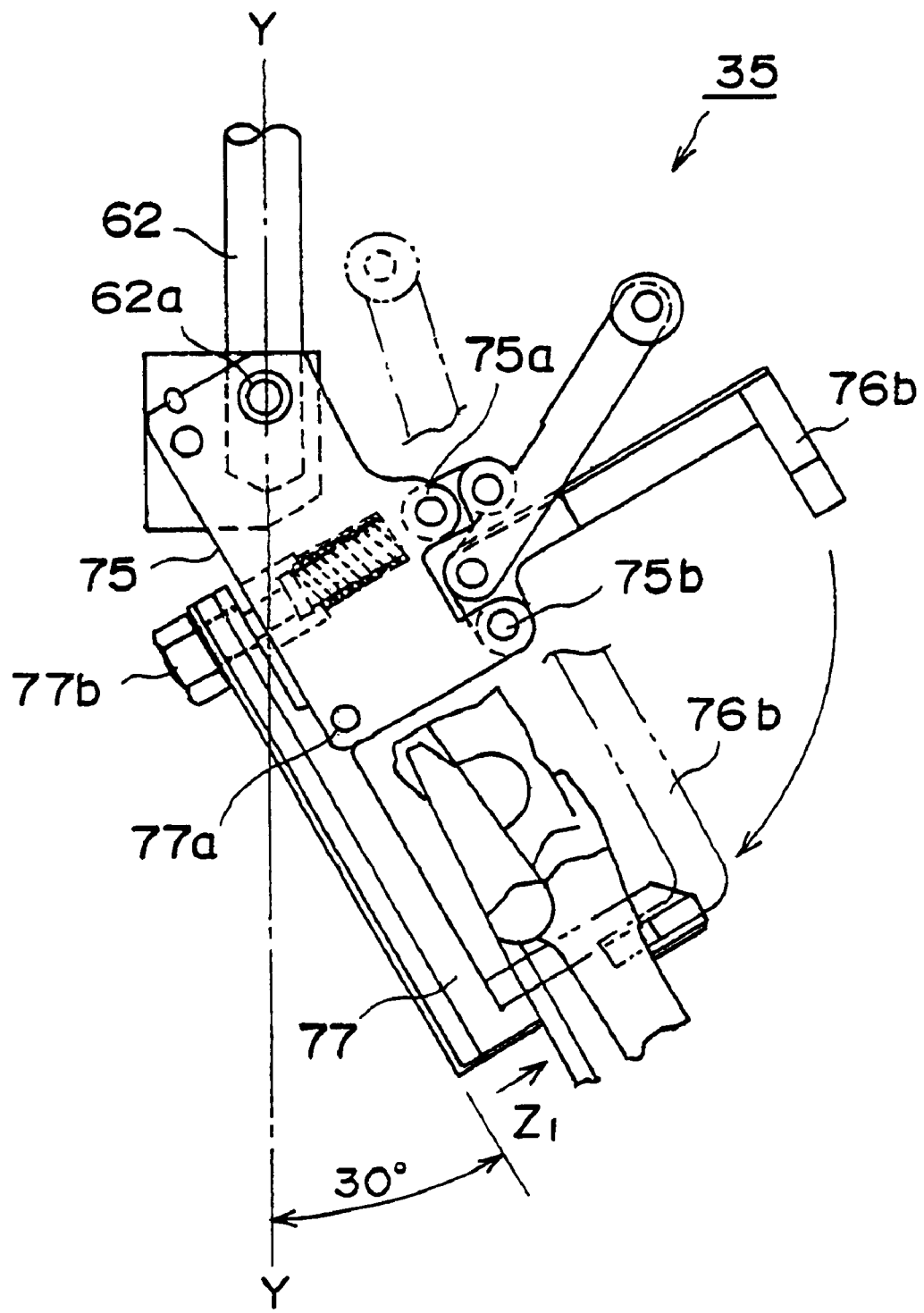
FIG. 14 is a front view showing a schematic structure of the clamper of FIG. 9.

FIG. 1(A) is a front view showing a schematic constitution of a semi-automatic deboning process for deboning a pig thigh and FIG. 1(B) is a side view of the same, FIG. 2 is views showing conditions of processing steps in a preliminary processing apparatus of FIG. 1, FIG. 3 is a condition of stripping a hip bone at ST 5 of FIG. 1, FIG. 4 is a view showing a cutting-in operation of FIG. 2, FIG. 5 is a view showing conditions of processing steps in a full automatic processing apparatus of FIG. 1, FIG. 9 is a view showing how a driving means is connected to a transport/processing means of FIG. 1, FIG. 10(A) is a carriage constituting a transport mechanism running on transport rails while hanging a clamper of FIG. 9, FIG. 11 is a side view showing a schematic structure of the meat separator constituting meat stripping mechanism of FIG. 9, FIG. 12(A) is a front view of a cutter mechanism constituting a cutting means and FIG. 12(B) is a side view of the mechanism, FIG. 13 is a side view of a detecting/computing means for detecting the base position of a fibula head of FIG. 9 and FIG. 14 is a front view showing a schematic structure of the clamper of FIG. 9.

FIG. 1(A) shows a schematic constitution of a semi-automatic deboning process for a pig thigh. As can be seen from the figure, a semi-automatic pig thigh deboner of the present invention comprises: a preliminary processing apparatus 31 which includes stations constituting forward steps and a full automatic deboner 32 which includes stations constituting backward steps. In the preliminary processing apparatus 31, a transport chain 33 of an endless type is provided, a work 30 which is the pig thigh is held by gripping, transport/processing means 34 is forced to take a inclined position by an inclining mechanism 37 at each of the stations through the transport chain 33, and cutting-in by hand and deboning with the help of an actuator 53 is performed, while in the full automatic deboner 32, driving means 70 provided for each station and the transport/processing means 34 which performs processing by receiving forces of stripping, rotating, vertical movement are connected with each other to perform a continuous automatic deboning operation.

The preliminary processing apparatus 31, as seen from FIGS. 1(A) and 1(B), plays steps ST1 to ST7 (St i indicates the ith station counting from a starting station on the processing line) and specialized steps which are shown below are processed by operators 40 and inclining mechanisms 37 provided for the respective stations, wherein reduction in labor burden on the operators 40 and no requirements for a high degree of experience and special processing knowledge of the operators 40 are realized. That is, in the preliminary processing apparatus 31, the following 7 steps are included:

(1) work loading;
(2) caudal vertebrae removing;
(3) cutting-in for an ilium and a lumbar vertebrae;
(4) ischium scooping;
(5) hip bone stripping;
(6) cutting-in for a hind shank (fibula side); and
(7) cutting-in for a hind shank (tibia side) and a femur.

Next, in the full automatic deboner 32, as seen from FIG. 1, there are played steps ST8 to ST20 in which the work 30 which is fed from the preliminary processing apparatus 31, where deboning on a hip bone, and a sacrum and a caudal vertebrae has been completed, is continued to be transported on a transport line while being held by gripping by means of transfer/processing means 34 which is equipped with a clamper 35, driving forces of stripping of the meat section, rotating and vertical movement of the work is made to act on the work 30 by driving means 70 which is provided at each station which gets connected to the transport/processing means 34, thus the work 30 is rotated and vertically moved to strip the meat section from a bone section with the help of a meat separator 50 and an organic tissue is then cut by cutting means included in a cutter mechanism 55 separately provided to the full automatic deboner 32, whereby the work is completely deboned.

That is, in the full automatic deboner 32, the following 13 steps are included:

(8) rotating the clamper 35 (rotation through 107 degrees);
(9) cutting along the circumference of an ankle side section (rotation through 360 degree);
(10) stripping the leg section;
(11) detecting a lower end section of the fibula as a first sensing step;
(12) separation cutting leg section muscle;
(13) cutting a section above a patelliform bone;
(14) cutting a section around the middle of the patelliform bone;
(15) stripping till a section on the femur under the femur joint and cutting along all the circumference of the section under the joint for separation start cutting;
(16) stripping for the femoral region and detecting the base position of the femur head as a second sensing step;
(17) cutting above a femur head;
(18) cutting around the femur head;
(19) final separation cutting; and
(20) rotating back the clamper through 107 degrees and discharge bones and stations in which the 13 steps are performed are automatically operated.

As mentioned above, a semi-automatic deboning process for a pig thigh comprises the preliminary processing steps of ST1 to ST7 and the full automatic processing steps of ST8 to ST20 to constitute a continuous circulating processing system; between both groups of the processing steps, a transport rails 33a of an endless type is provided, 20 transport/processing means 34 each of which has a transport mechanism equipped with the clamper 35 is hung from the endless transport chain 33 which runs on the rails 33a; the work is forced to take a downwardly inclined position with the help of an inclining mechanism 37 equipped in the preliminary processing apparatus; and the work receives driving forces of stripping of the meat section, rotating and vertical movement of the work by the driving means 70 equipped in each station of the full automatic deboner in the latter stage and at the same time the cutting means including through the cuter mechanism 55 makes possible automatic deboning processing such as stripping of the meat section, cutting an organic tissue and the like.

The transport/processing means 37, a carriage 61, the camper 35 (the former three items are necessary in the preliminary processing apparatus 31 as well), the meat separator 50, the cutter mechanism 55 and the detecting/computing means 90 for detecting the base position of the fibula head, which are necessary for the full automatic deboner 32, will be described in reference to FIGS. 9 to 14.

Since rotations of the cuter and the work are required, as described later, for cutting an organic tissue including a meat section and cutting is performed after meat stripping of the meat section, the corresponding station, as shown in FIG. 9, comprises; a rotating mechanism 69 having functions synchronous rotation of a clamper 35 and a meat separator 50, stoppage at a home position and deceleration stoppage at a predetermined position; a vertical movement mechanism 67 of the clamper 35, a rotatable meat separator 50 and a cutter mechanism 55.

Driving means 70 shown in FIG. 9 is provided in each station and a driving shaft 51 of the meat separator which is axially in common with a rotary vertically moving shaft 64 is designed to perfectly coincides with a stop position of a connecting shaft 62 of transport/processing means 34 hanging from a transport chain 33 through the carriage 60.

The cutter mechanism 55 is designed to provide a horizontal rotary circular blade 56 so as to contact with the top side of the meat separator 50 in a squeezing position.

The rotating mechanism 69 of the driving means 70, as shown in FIG. 90, comprises: an upright rotary shaft 72 provided with a servo rotating mechanism 69a: two chain transfer mechanisms 65, 54 which have a synchronous speed of rotation are respectively equipped at the base section and the lower end of the rotary shaft 72; a home position driving control sensor 71a and a deceleration sensor for stoppage at a predetermined position 71b for the clamper 35 and the meat separator 50 equipped through the chain transfer mechanisms 65, 54; and a cutter retreat timing sensor 71c also equipped to constitutes a driving control sensor 71.

The vertical movement mechanism 67, as shown in FIG. 9, comprises an upright rotary vertically moving shaft 64 having a straddle joint metal member 64a at the lower section, the mechanism 67 has a structure that it engages with a boat-shaped engaging member 63 in an engaging or disengaging manner, which, as described later, is mounted on the carriage 60, and the chain transfer mechanism 65 for rotation is disposed above the engaging member 63 and a rotary vertically moving shaft 64 connecting to a ball screw 68a driven by a servo motor 68 for vertical movement and a fixed vertically movement nut is provided on the chain transfer mechanism 65 so that the shaft 64 can vertically rotatably be moved with freedom.

The transport/processing means 34, as shown in FIG. 9, comprises: the clamper 35; a connecting shaft 62 supporting the clamper 35 in a freely inclined manner; and the carriage 60 constituting a transport mechanism, in a freely rotatable manner, mounted on the upper end of the connecting shaft 62.

The clamper 35, as shown in FIG. 14, has a body section 75 which is mounted so as to be freely inclined about a inclination pin 62a as a center at the lower section of the connecting shaft 62, a toggle lever 76d is provided on one side of the body 75, there is provided a reception opening 77 adjustable by a pin 77a and a adjusting pin 77b in a corresponding manner to a size of an ankle side section which is received on the other side of the body 75 and thereby the work is fixedly received so as to enable the work to be inclined at about 30 degrees.

The carriage 60, as seen from FIG. 10(A), has 4 horizontally rotatable rollers 61a which are mounted at both ends of each of two parallel horizontal fixed shafts provided on both opposed sides of a near-rectangular member 61 through which the connection shaft 62 is freely rotatably inserted in an engaging manner and thereby a running plane on which the carriage 60 runs is limited, furthermore 4 upright rotary rollers 61a are provided at respective 4 corners of the bottom surface of the rectangular member 61 with the same interval of each pair so as to control its running in a direction rightward or left ward and thereby the carriage 60 is controlled in its running in two directions of rightward or leftward, and upward or downward so as to enable the carriage 60 to run along the transport rails 33a.

Besides, a boat-shaped engaging member 63 with a top view of a near-rhombus is provided on the top of the upright connecting shaft 62 inserted in a freely rotatable manner in the center of the rectangular member 61 as shown in FIG.

1(B), the boat-shaped engaging member 63 engages with the straddle joint 64a mounted at the lower end of the rotary vertically moving shaft 64 when being stopped at a station and driving forces of vertical movement and rotating can be transferred to the transport/processing means 34 when the boat-shaped engaging member 63 is kept stopped.

Figure 11A:
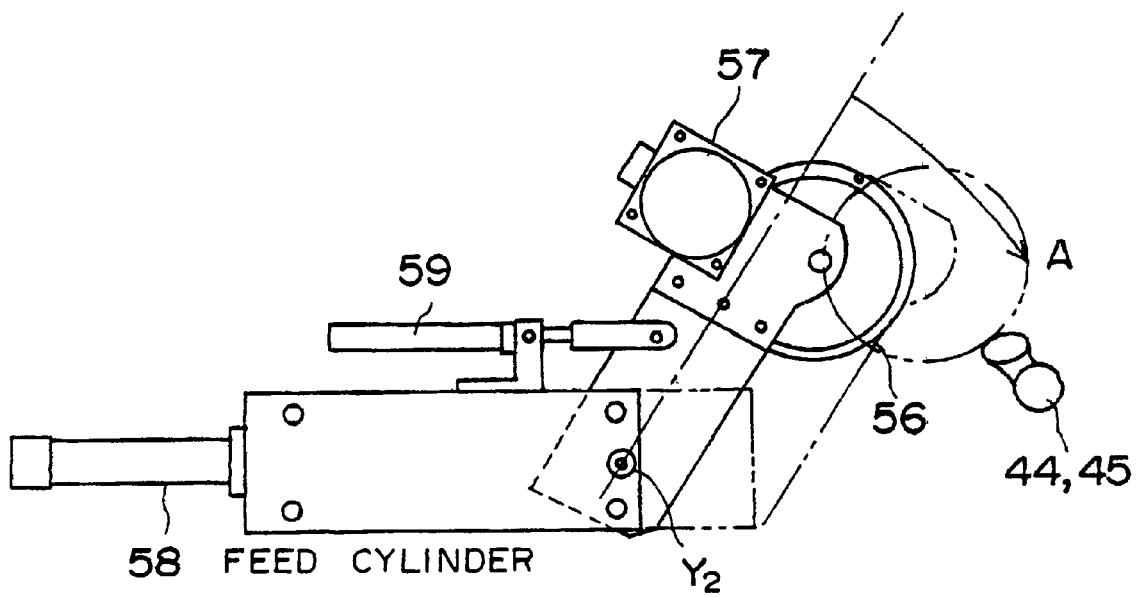
FIG. 11 is a side view showing a schematic structure of the meat separator constituting meat stripping mechanism of FIG. 9.
Figure 11B:
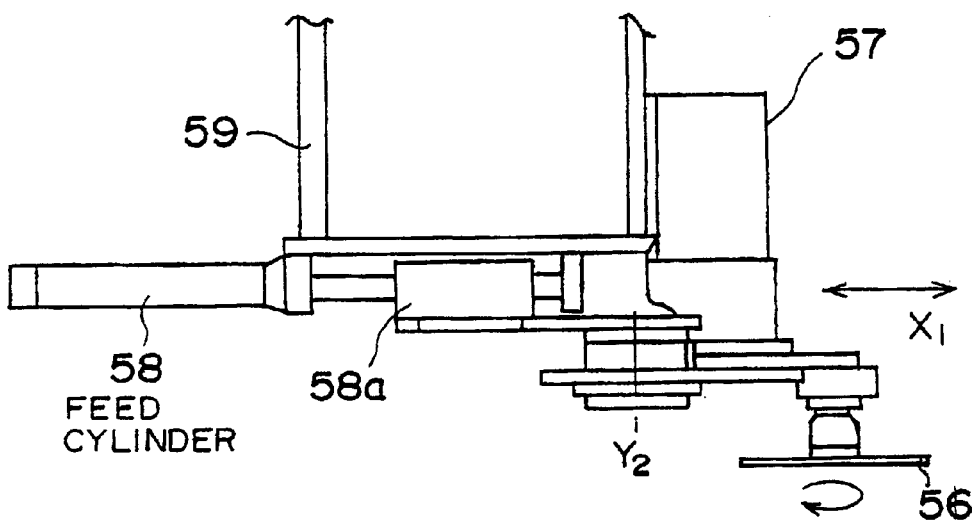

In FIG. 11(A), a front view of the cutter mechanism 55 is shown, in FIG. 11(B), a side view thereof is shown. As shown in the figures, the cutter mechanism 55 comprises: a horizontal rotary circular blade 56; a drive motor 57 for the circular blade 56; an oscillation cylinder 59; a feed/retreat cylinder 58 for feeding the cutter to or retreating it from a cutting position; and a slide shifter 58a. A horizontal rotary circular blade 56 including the feed/retreat cylinder 58 and the oscillation cylinder 59 which works so as to make the blade 56 freely contacted to a cutting section under a freely adjustable pressure are disposed at a lower section of a mounting member through the slide shifter 58a.

When the cutter mechanism 55 is used, not only is the horizontal rotary circular blade 56 which is driven by the drive motor 57 fed till contacting to a bone section through the cylinder 58 but the edge of the blade 56 is adjusted to press at a proper pressure by the oscillation cylinder 59. Then, the work 30 is rotated by a necessary cutting width. Thus, a combination of rotation of the work 30 and the cutter mechanism 55 constitutes cutting means and the work 30 can be cut by a necessary width from a desired position. If there is a projection and recess in a cutting section during rotation of the work 30, the oscillation cylinder 56 can absorb the projection and recess so as to realize perfect cutting.

In FIG. 12, a schematic structure 50 of the meat separator 50 is shown. As shown in the figure, an upright driving shaft 51a is freely rotatably mounted on a mounting base 51a and a ring 51c with a groove is provided between an upper fixed ring 51b and the base 51a of the driving shaft 51 so that the ring with a groove 51c can freely rotatably and vertically slide between therebetween.

The groove 51d of the ring 51c with a groove is supported by both sides of the groove 51d using a link 53b connecting to a driving fore end 53a of an actuator 53, the ring 51c with a groove is vertically moved by a link motion of the link 53b and the squeezing members 52, 52 each having a shape of three sides intersecting at right angles takes positions so as to squeeze therebetween while freely opening or closing, wherein a link mechanism is constructed from the top end of the ring 51c with a groove, two hinged supports 52a, 52a formed on the side of the upper fixed ring 51b and the squeezing member 52, 52.

Upper squeezing plates 52b, 52b of the squeezing members 52 each are provided with a U-recess and when the squeezing members 52 are in a squeezing condition, a bone section of the work is stripped and scraped under a freely adjusted pressure so that the meat section can be separated from the bone section to a perfect manner.

Mounting of the meat separator 50, as shown in FIG. 9, is performed in such a manner that the rotary vertically moving shaft 64 of the driving means 70 is formed in an upright manner at the uppermost position and the connecting shaft 62 of the transport/processing means 34 is disposed under the rotary vertically moving shaft 64 and the driving shaft 51 of the meat separator 50 is aligned with the above shafts 64, 62 so as form one common upright axial line. When the rotary vertically moving shaft 64 of the vertical movement mechanism 67 moves down to the lowest position, a squeezing plane of the meat separator 50 is located at a height at which the lower surface of the clamper 35 which is mounted to the connecting shaft 62 in an upright manner of the transport/processing means 34 with which the rotary vertically moving shaft 64 is in an engaging manner connected nearly contacts with the squeezing plane.

A chain transfer mechanism 54 is provided between the lower end of the driving shaft 51 of the meat separator 50 and the upright rotary shaft 72 of the rotating mechanism 69 and the chain transfer mechanism 54 is operated in synchronization with a chain transfer mechanism 65 provided between the upright rotary shaft 72 and the rotary vertically moving shaft 64 and thereby cutting by the cutting means is improved to an more efficiently and more certain extent.

In an automatic deboning process for a pig thigh, it has been established that it is necessary to recognize individual differences and then to determined a proper cutting position, but a position of the base position of a hind shank head is detected in order to know a position of a joint connecting between the hind shank and a femur which is a necessary position to be determined and a detected/computed value of the base position of the hind shank head is set as a first reference value and cutting positions in ST12 to ST15 described later are determined by use of the first reference value.

Since a position of a femur head cannot be determined from the first reference value, a separate measurement is performed and a length between the base positions of the hind shank and the femur heads is measured and the value is set as a second reference value to determine the cutting positions in ST17 to ST19.

In FIG. 13, a schematic constitution of a detecting/computing means 90 for the base position of a fibula will be described below.

As can be seen from FIG. 13, a structure is present, in which a guide plate 83 and a measuring plate 87 which are parallel to each other and which are inclined with respect an axial line Y—Y of the connecting shaft 62 which moves vertically the clamper 35 for stripping the meat section of the fibula 45 are provided and the fore ends contact with the bone section 45 immediately after the squeezing plates 52b, 52b of the meat separator 50 pass by.

The measuring plate 87 is disposed in an inclined manner with respect to the fibula 45 under a freely adjustable pressure by means of an auxiliary cylinder 84 through a linear guide 86 and a displacement of the measuring plate 87 relative to the guide plate 83 due to a change in shape of an exposed bone section to which the measuring plate 87 contacts is computed by an encoder 85 mounted to the auxiliary cylinder 84. The guide plate 83 is moved forward or backward by a forward/backward cylinder 81 mounted to a metal mounting member 80 through a linear guide 82.

Measurement of the base position of a fibula head using the detecting/computing means 90 is performed in such a manner that the guide plate 83 and measuring plate 87 are moved forward by the forward/backward cylinder 81 so as to contact a bone section of the fibula with certainty under pressure, wherein the measuring plate 87 is also simultaneously moved by the auxiliary cylinder 84 so as to be positioned ahead of the guide plate 83.

In such a configuration of the guide plate 83 and the measuring plate 87 relative to the bone section where both plates and the bone section are in mutual contact, the clamper 35 is raised by a servo motor 68 for vertical movement, thereby a contact position of the fibula with the guide plate 83 and the measuring plate 87 is shifted downward and when the contact position reaches a point A of the lower end section of the fibula, the measuring plate 87 is rapidly moved forward relative to the guide plate 83. This change in condition is read by the encoder 85 to compute a joint position.

Measurement of the base position of a femur head is performed in such a manner that the work is raised through the clamper using an air cylinder, not shown, wherein an encoder is provided for measuring a length of the raise, that is the femur is raised by the clamper 35 and a position where the head of the femur is caught by the meat separator and thereby the work is stopped is read and computed by the encoder to be set as the position of the minimal raise length.

The preliminary processing steps for a semi-automatic deboning method for a pig thigh will be described below.

As shown in FIGS. 1(B), 3 and 4, in the preliminary processing steps ST1 to ST7, an operator processes a work 30, which is an hanging pig thigh, with the help of transport/processing means 34 in a standing position and at that time, the work 30 is positioned inclined at about 30 degrees downwardly so as to reduce a labor load.

That is, as can be seen from FIG. 2, the steps are advanced in the following ways:

at ST1, an ankle side section is clamped, wherein the ankle side section of the work 30 is held fast by the clamper 35 of the transport/processing means 34 and processing is started after confirming completion of other preliminary procedures;

at ST2, removing the caudal vertebrae 41 only; at ST3, cutting-in for an ilium and a lumbar vertebrae is performed, wherein the cutting-in is performed on the surface of the work starting from an ischium, advancing along a hole and reaching the ilium, a meat on a hip bone 43 is stripped downwardly at the cutting-in position and cutting-in is further performed from an end of a sacrum through the ilium and the to the ischium to expose a surface of the hip bone 43;

at ST4, cutting-in on the rear side of ischium 42 is performed and the ischium 42 is scooped;

at ST5, the hip bone, the sacrum and the caudal vertebrae are removed by a hip bone, sacrum, caudal vertebrae removing apparatus, wherein as can be seen from FIG. 3, the work 30 gripped by the clamper 35 of the transport/processing means 34 has a downwardly inclined position with the help of an inclining mechanism 37 comprising a top fixing member 37a and a bottom fixing member 37b, a claw 36b of the hip bone, sacrum, caudal vertebrae removing apparatus 36 is inserted into the hole of the hip bone exposed by the cutting-in at a previous step, then the claw 36b is closed, not only is the hip bone raised up but cutting-in around an acetabulum is performed by retreating an arm 36a and then the hip bone, sacrum, caudal vertebrae removing apparatus 36 is lowered to remove the hip bone;

at ST6, cutting-in on one side (fibula side) of the hind shank is performed, wherein the cutting-in is conducted along the tibia side surface of the fibula 44 from the ankle side to the base position of the head; and at ST7, cutting-in on the other side (tibia side) of the hind shank is performed, wherein the cutting-in is conducted in the tibia side from the ankle side to the top of the hind shank joint and besides shallow cutting-in is conducted, along the inner side of the thigh, from the femur head to the base position of the fibula head to which the cutting-in is already conducted.

Figure 6:
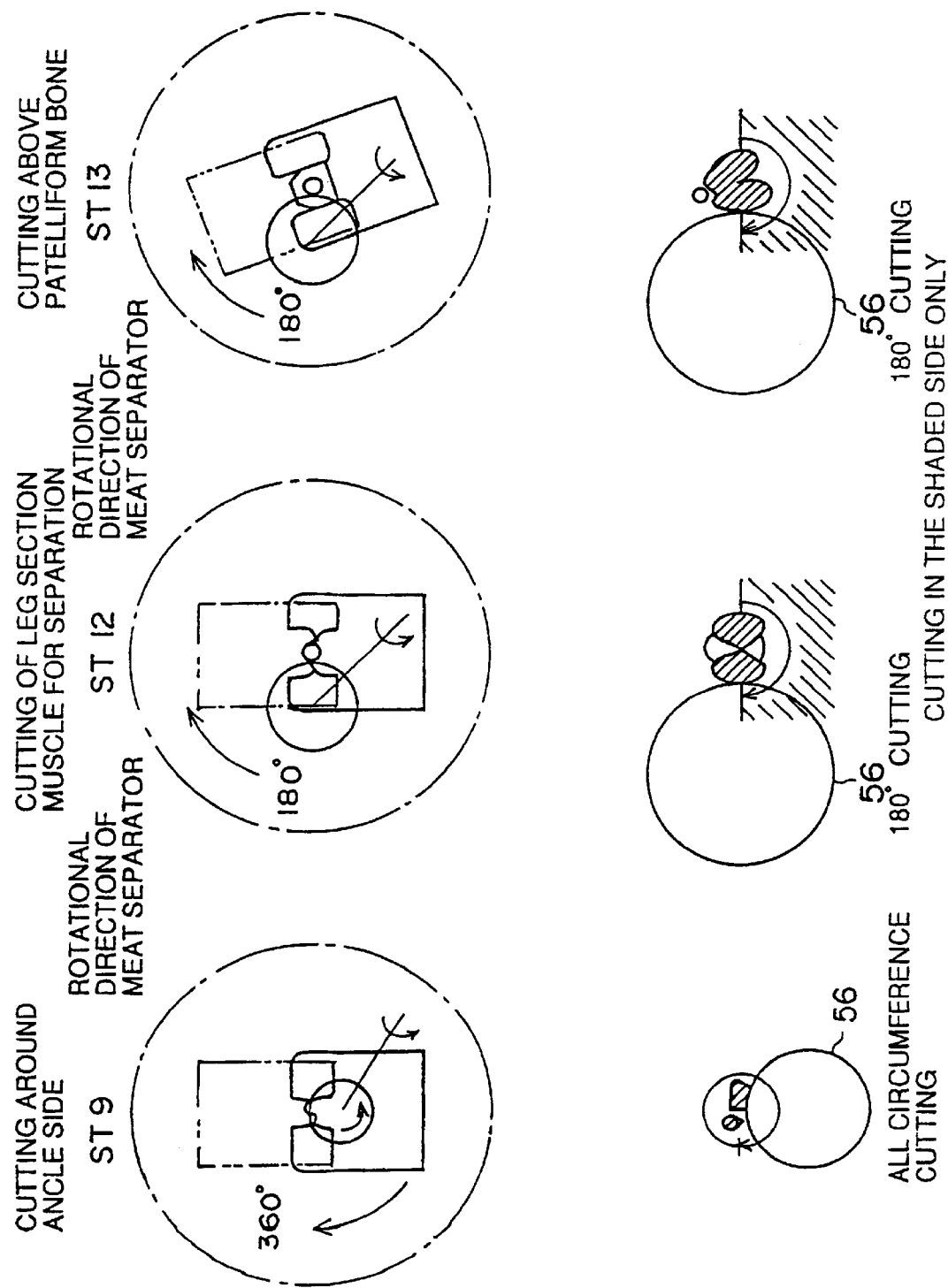
FIG. 6 is diagrams showing conditions of rotation of a meat separator and cutting planes at ST9, ST12 and ST13 of FIG. 5.

The full automatic deboner 32 works as can be seen from FIG. 5 in steps of ST8 to ST20 in such a manner that a work 30 is transported while being held by gripping by the transport/processing means 34 with the clamper 35 on the transport line, the work 30 is further rotated or vertically moved upward or downward by the driving means 70 provided at each station, thereby a meat section of the work 30 is stripped from a bone section thereof with the help of the meat separator 50 and then an organic tissue is cut by a cutter mechanism 55 separately equipped to debone automatically to a full extent. That is, the steps are advanced in the following ways:

at ST8, the clamper 35 of the transport/processing means 34 rotated by 107 degrees, wherein since there is a phase difference between the preliminary steps and the full automatic steps, at this station the work 30 is rotated its orientation by 107 degrees for the following steps of the ST8;

at ST9, cutting-in along all the circumference of the ankle side section is performed as shown in FIG. 6, wherein a rotary circular blade 56 is pressed to the ankle side section with a proper magnitude of a pressure by the feed/retreat cylinder 58 of the cutter mechanism 55, while the clamper 35 is rotated, and thus the pig thigh 30 is rotated through 360 degrees to give cutting-in along all the circumference of the ankle side section;

at ST10, the leg section is stripped by 60 mm, wherein the meat separator is closed at ST9 and the work 30 is raised by 60 mm from the cutting position at ST9 to remove the meat section of the leg section in a 60 mm distance;

at ST11, the leg section is further stripped and measurement 1 (first measurement) is conducted, wherein stripping is continued from the stripped position at ST10 by use of the servo motor 68 for vertical movement of the vertical movement mechanism 67 while measuring a raising height, simultaneously with the stripping, the measuring plate 87 and the guide plate 83 of the detecting/computing means 90 are pressed to the fibula 45 and a shape of the fibula 45 is measured, when a change of a displacement of the measuring plate 87 relative to the guide plate 83 exceeds a value, the measuring plate is raised to stop the measurement and the raising height of the servo motor 68 at the stoppage of the measurement is registered as a first measuring value, which is used as a reference value for raise till a second measurement following the above measurement;

at ST12, the leg section stripping is conducted till under the fibula head and muscles of the leg section are cut for separation through 180 degrees, wherein as shown in FIG. 6, the meat separator 50 is closed, the clamper 35 is raised to a height of the reference value+α, and rotated after the cutter is advanced to cut around a section at the base position of the fibula head through a rotational angle of 180 degrees under the rotation, thereafter the cutter is retreated, the pig thigh 30 is further rotated through another 180 degrees to thereafter return back to the original position and stopped there, after the stoppage the meat separator 50 is opened and the clamper 35 is lowered to a reference position and in this case, muscle tissues at the base position of the hind shank head are cut but the tissues on the patelliform bone side are left uncut in order to leave the patelliform bone intact;

at ST13, stripping is performed till above a femur side section of the joint and cutting a section above the patelliform bone through 180 degrees is performed, wherein as shown in FIG. 6, the meat separator 50 is closed and the clamper 35 is raised to a height of the reference value+β and then the cutter is advanced, the clamper 35 and the meat separator 50 are rotated to cut around the section above the femur joint through a rotational angle of 180 degrees and after the cutting the cutter is retreated, the pig thigh is further rotated through another 180 degrees to thereafter return back to the original position and stopped there and then the meat separator is opened and the clamper is lowered to the reference position;

at ST14, stripping till a middle section of the femur joint and cutting along all the circumference of the patelliform bone are both performed, wherein as shown in FIG. 7, the meat separator 50 is closed, the clamper 35 is raised to a height of the reference value+γ, the cutter is advanced, the clamper 35 and the meat separator 50 are rotated to cut around the middle section of the femur joint through a rotational angle of 360 degrees, after the stoppage of the rotation, the cutter is retreated, the meat separator 50 is opened, the clamper 35 is lowered to its original position and in this case, since there is no fear for the patelliform bone to be separated from the bone section, all the circumference is cut;

at ST15, stripping till a section under the femur joint and cutting along all the circumference of the section under the joint are both performed, wherein as shown in FIG. 7, the meat separator is closed, the clamper 35 is raised to a height of the reference value+δ, the cutter is advanced, the clamper 35 and the meat separator 50 are rotated to cut the lower section of the femur joint through a rotational angle of 360 degrees, after the stoppage of the rotation, the cutter is retreated, the meat separator 50 is opened and the clamper 35 is lowered to its original position;

at ST16, stripping for the femoral region and second measurement are performed, where the meat separator is closed, the clamper 35 is raised by an air cylinder with an encoder equipped therewith which are provided instead of the vertical movement mechanism of the driving means 70 at ST16, a stroke of raise is not fixed and the raise is continued till the separator 50 is caught by the femur, in this case the raising height is measured by the encoder provided on the side of the cylinder and the raising height is computed as a second measuring value, which is used as the second reference value for raise in the following steps;

at ST17, stripping till the base position of the femur head and cutting along all the circumference of a section at the base position of the femur head are both performed, wherein as shown in FIG. 8, the meat separator 50 is closed, the clamper is raised to a height of the second reference+ε, the cutter is advanced, the clamper 35 and the meat separator 50 are rotated to cut around the base position section through a rotational angle of 360 degrees, then the rotation is stopped, the cutter is retreated, the meat separator is opened and thereafter the clamper 35 is returned down to the second reference position, which is its original position;

at ST18, stripping till a section above the femur head and cutting along all the circumference of the section above the femur head are both performed, wherein as shown in FIG. 8, the meat separator 50 is closed, the clamper 35 is raised to a height of the second reference value+ζ, the cutter is advanced, the clamper 35 and the meat separator 50 are rotated, thereby the section above the femur head cut through a rotational angle of 360 degrees therearound, then the rotating is stopped, the cutter is retreated, the meat separator is opened and thereafter the clamper is returned down to the second reference position which is its original position;

at ST19, final cutting is performed, wherein as shown in FIG. 8, the meat separator 50 is closed, the clamper 35 is raised to a height of the second reference value+η, the cutter is advanced, a section under the greater trochanter of the femur head is cut to separate the meat section from the bone section, then the cutter is retreated, the meat separator 50 is opened, thereafter the clamper is returned down to the second reference position, which is its original position and then the meat section of the pig thigh is discharged to the outside of the system by a conveyor provided under the meat separator; and at ST20, a positioning section (including the clamper 50) is rotated through 107 degrees and bones are discharged, wherein the clamper 35 which is rotated at ST8 is again rotated to return back to the orientation and the raising position in the preliminary processing and the bones are released from the clamper 35 to be discharged to the outside of the system by means of the conveyor.

EFFECT OF THE INVENTION

With application of the above structure of the present invention, a pig thigh which is a heavy article is held in a hanging condition and transported through work stations, manual procedures can be limited only to cutting-in operations conducted in the preliminary steps, in which minor labor is consumed, and since the pig thigh to be processed in the preliminary steps is positioned inclined downwardly at about 30 degrees by the inclining capable clamper, a higher efficiency and a reduced labor operation can be achieved.

Major deboning operations can be performed in a highly efficient processing by the full automatic machine, cutting by the cutter is conducted by a combination of the rotary blade and rotation of the work and thereby cutting position and cutting width are secured as necessary. Besides, detection of the base positions of respective fibula and femur heads is effected by a change in shape of a bone section and positional discrepancy due to individual differences is thereby prevented during the later stages to achieve a higher efficiency in operation and at the same time not only is conventional heavy labor excluded but hygienic deboning is realized.

We claim:

1. A semi-automatic pig thigh deboner, in which a pig thigh held by gripping on a transport line having a preliminary processing apparatus as a first stage is sequentially deboned starting from a hind shank, comprising: the transport line along which a plurality of work stations are provided; transporting/processing means for transporting the pig thigh while holding the pig thigh by gripping through the work stations sequentially and processings are respectively performed on the pig thigh at the work stations under application of driving forces for stripping of the meat section, rotating and vertical movement of the pig thigh; driving means for outputting the driving forces for stripping of the meat section, rotating and vertical movement of the pig thigh, the driving means being provided at each of the work stations; cutting means for cutting an organic tissue away from an exposed bone section; and detecting/computing means for detecting the base positions of heads of a fibula and a femur.

2. A semi-automatic pig thigh deboner according to claim 1, wherein the transport/processing means comprises: a clamper to fixedly grip the ankle side section of a pig thigh; a connecting shaft which can support the clamper in an inclining manner; and a transport mechanism through which the connecting shaft is inserted in a freely rotatable manner, wherein the clamper is rotated and vertically moved by receiving the driving forces from the driving means which engages with the clamper by means of a boat-shaped engaging member, forming a transfer joint, provided on the top of a connecting shaft.

3. A semi-automatic pig thigh deboner according to claim 1, wherein the driving means comprises: a vertical moving mechanism in which vertically moves the pig thigh by being connected to the connection shaft of the transport/processing means; a rotating mechanism to rotate the connecting shaft and a meat section stripping mechanism in synchronization with each other; and the meat section stripping mechanism.

4. A semi-automatic pig thigh deboner according to claim 3, wherein the rotating mechanism has confirmation functions of home position driving, deceleration stoppage at a predetermined position, and cutting stoppage.

5. A semi-automatic pig thigh deboner according to claim 3, wherein the meat section stripping mechanism is disposed on the same common axial line with the vertical movement mechanism, and a positioning section is located between both, one above the other while being held by both, and comprises: a squeezing section in which a bone section to be removed is squeezed under a freely adjustable pressure so as to perfectly strip the meat section from the bone section; and a driving shaft which can be rotatable at a synchronous speed of rotation with the clamper.

6. A semi-automatic pig thigh deboner according to claim 1, wherein the cutting means comprises a cutter mechanism which sets a cutter under a freely adjustable pressure at a cutting start position, and a rotational angle of the work and a necessary cutting width can be set.

7. A semi-automatic pig thigh deboner according to claim 1, wherein the detecting/computing means for detecting the base positions of heads of a fibula and a femur comprises a position detecting/computing mechanism to sense a rapid change in shape of the bone section.

8. A semi-automatic pig thigh deboner according to claim 1, wherein the preliminary processing apparatus comprises: the transport line along which a plurality of work stations are provided; a inclining mechanism which makes the pig thigh to take a downwardly inclining position while being hung, and which is provided at each station; the transport/processing means which transports the pig thigh sequentially through the plurality of stations while holding by gripping the pig thigh and obtains a desired downwardly inclined position with the help of the inclining mechanism; and a hip bone, sacrum, caudal vertebrae removing mechanism which removes the hip bone, sacrum and caudal vertebrae from the pig thigh having received cutting-in, whereby the apparatus performs removal of the hip bone, sacrum and caudal vertebrae and cutting-in before and after the removal of the bones.

9. A semi-automatic deboning process for a pig thigh in which a pig thigh held by gripping on a transport line having a preliminary processing apparatus as a first stage is sequentially deboned starting from a hind shank, comprises preliminary processing steps of: holding by gripping the ankle side section of a work in a positioning section; removing a hip bone, and a sacrum and a caudal vertebrae of the gripped work; and cutting-in for a hind shank and a femur, and the process further comprises the steps of: stripping a meat section around the hind shank after it is processed in the preliminary processing steps; exposing a fibula to detecting the base position of a fibula head as a first sensing step; stripping a meat section around above a joint and cutting an organic tissue exposed by the stripping for separation of leg section muscles; cutting a patelliform bone related section; stripping for the femoral region and detecting the base position of a femur head as a second sensing step; cutting a femur head related section; and separating by cutting the meat section from the bone section to discharge.

* * * * *